US005831413A

United States Patent [19]

Gould

[11] Patent Number: 5,831,413

[45] Date of Patent: Nov. 3, 1998

[54] EMERGENCY LIGHT SYSTEM

[76] Inventor: Russell H. Gould, 508 Forest Park Dr., Pensacola, Fla. 32506

[21] Appl. No.: 911,930

[22] Filed: Aug. 15, 1997

[51] Int. Cl.[6] .................................. H02J 7/00; F21L 7/00

[52] U.S. Cl. .......................... 320/110; 320/107; 362/194; 362/183

[58] Field of Search .................................... 320/110, 107; 362/194, 183

[56] References Cited

U.S. PATENT DOCUMENTS

| | | | |
|---|---|---|---|
| 2,257,866 | 10/1941 | Talbot et al. | 320/107 |
| 2,556,506 | 6/1951 | Roberts | 320/107 |
| 3,015,719 | 1/1962 | Kirkman | 362/194 |
| 3,087,052 | 4/1963 | Torgerson . | |
| 3,944,805 | 3/1976 | Moore . | |
| 4,081,737 | 3/1978 | Miyahara | 320/107 |
| 4,086,454 | 4/1978 | Bluhm . | |
| 4,321,657 | 3/1982 | Hoi | 362/183 |
| 4,396,881 | 8/1983 | Cook et al. | 320/107 |
| 4,607,207 | 8/1986 | Bruneau . | |
| 4,791,347 | 12/1988 | Britton | 320/110 |
| 5,072,347 | 12/1991 | Brunson | 362/194 |
| 5,085,043 | 2/1992 | Hess et al. | 320/107 |
| 5,455,751 | 10/1995 | Lynch et al. | 362/194 |

*Primary Examiner*—Peter S. Wong
*Assistant Examiner*—K. Shin
*Attorney, Agent, or Firm*—Joseph N. Breaux

[57] ABSTRACT

An emergency light system adapted to be powered by a vehicle wet cell battery that includes a rectangular shaped snap on system housing member that has a battery top receiving compartment formed therein, first and second terminal receiving members extending into the battery top receiving compartment and two snap connectors for snap connecting the system housing member to a vehicle wet cell battery, the first and second terminal receiving members each having a cylindrical shaped terminal receiving cavity formed therein sized to receive a battery terminal of a vehicle wet cell battery and having a spring biased electrical contact positioned therein, each spring biased electrical contact including an electrically conducting biasing spring and a contact member attached to a moveable end of the biasing spring; a rectangular shaped bulb housing positioned on top of the system housing member and defining a lamp compartment in connection with a rectangular diffuser lens opening, the rectangular shaped bulb housing including air vent openings formed through a sidewall thereof and into airflow connection with the lamp compartment; a lamp diffuser lens covering the rectangular diffuser lens opening of the bulb housing member; an on/off switch; and a lamp socket mounted within the rectangular lamp compartment; the lamp socket being wired in series with the on/off switch and between the contact members of the spring biased electrical contacts positioned within the cylindrical shaped terminal receiving cavities of the first and second terminal receiving members.

16 Claims, 3 Drawing Sheets

EMERGENCY LIGHT SYSTEM

TECHNICAL FIELD

The present invention relates to portable light sources and more particularly to an emergency light system powerable by a conventional, twelve volt, two terminal, vehicle wet cell battery that includes a rectangular shaped snap on system housing member that has a battery top receiving compartment formed therein, first and second terminal receiving members extending into the battery top receiving compartment and two snap connectors for snap connecting the system housing member to a vehicle wet cell battery, the first and second terminal receiving members each having a cylindrical shaped terminal receiving cavity formed therein sized to receive a battery terminal of a vehicle wet cell battery and having a spring biased electrical contact positioned therein, each spring biased electrical contact including an electrically conducting biasing spring and a contact member attached to a moveable end of the biasing spring; a rectangular shaped bulb housing positioned on top of the system housing member and defining a lamp compartment in connection with a rectangular diffuser lens opening, the rectangular shaped bulb housing including air vent openings formed through a sidewall thereof and into airflow connection with the lamp compartment; a lamp diffuser lens covering the rectangular diffuser lens opening of the bulb housing member; an on/off switch; and a lamp socket mounted within the rectangular lamp compartment; the lamp socket being wired in series with the on/off switch and between the contact members of the spring biased electrical contacts positioned within the cylindrical shaped terminal receiving cavities of the first and second terminal receiving members.

BACKGROUND OF THE INVENTION

The loss of municipal electrical power accompanies many natural disasters such as storms or tornadoes. Although electrical power is often lost, it is during these times that electrical lighting can supply critical visibility to avoid injury or to assist the injured. It would, therefore, be a benefit to have a lighting system that could be powered by a readily available and readily renewable power supply. Because automobile batteries can supply a large amount of electrical power and because the charge on an automobile battery can be renewed by running the vehicle battery in the ordinary usage of the vehicle, it would be a benefit to have a lighting system that was adapted for use with automobile batteries. Because automobile batteries can have electrical terminals positioned on the top or on the side, it would be a benefit if the emergency lighting system included adapters for connecting the emergency lighting system to either type of automobile battery.

SUMMARY OF THE INVENTION

It is thus an object of the invention to provide an emergency light system that can be powered by a readily available and readily renewable power supply.

It is a further object of the invention to provide an emergency light system that is adapted for use with automobile batteries.

It is a still further object of the invention to provide an emergency light system that includes adapters for connecting the emergency lighting system to side terminal type automobile batteries.

It is a still further object of the invention to provide an emergency light system that includes a rectangular shaped snap on system housing member that has a battery top receiving compartment formed therein, first and second terminal receiving members extending into the battery top receiving compartment and two snap connectors for snap connecting the system housing member to a vehicle wet cell battery, the first and second terminal receiving members each having a cylindrical shaped terminal receiving cavity formed therein sized to receive a battery terminal of a vehicle wet cell battery and having a spring biased electrical contact positioned therein, each spring biased electrical contact including an electrically conducting biasing spring and a contact member attached to a moveable end of the biasing spring; a rectangular shaped bulb housing positioned on top of the system housing member and defining a lamp compartment in connection with a rectangular diffuser lens opening, the rectangular shaped bulb housing including air vent openings formed through a sidewall thereof and into airflow connection with the lamp compartment; a lamp diffuser lens covering the rectangular diffuser lens opening of the bulb housing member; an on/off switch; and a lamp socket mounted within the rectangular lamp compartment; the lamp socket being wired in series with the on/off switch and between the contact members of the spring biased electrical contacts positioned within the cylindrical shaped terminal receiving cavities of the first and second terminal receiving members.

It is a still further object of the invention to provide an emergency light system that accomplishes some or all of the above objects in combination.

Accordingly, an emergency light system has been provided. The emergency light system includes a rectangular shaped snap on system housing member that has a battery top receiving compartment formed therein, first and second terminal receiving members extending into the battery top receiving compartment and two snap connectors for snap connecting the system housing member to a vehicle wet cell battery, the first and second terminal receiving members each having a cylindrical shaped terminal receiving cavity formed therein sized to receive a battery terminal of a vehicle wet cell battery and having a spring biased electrical contact positioned therein, each spring biased electrical contact including an electrically conducting biasing spring and a contact member attached to a moveable end of the biasing spring; a rectangular shaped bulb housing positioned on top of the system housing member and defining a lamp compartment in connection with a rectangular diffuser lens opening, the rectangular shaped bulb housing including air vent openings formed through a sidewall thereof and into airflow connection with the lamp compartment; a lamp diffuser lens covering the rectangular diffuser lens opening of the bulb housing member; an on/off switch; and a lamp socket mounted within the rectangular lamp compartment; the lamp socket being wired in series with the on/off switch and between the contact members of the spring biased electrical contacts positioned within the cylindrical shaped terminal receiving cavities of the first and second terminal receiving members.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
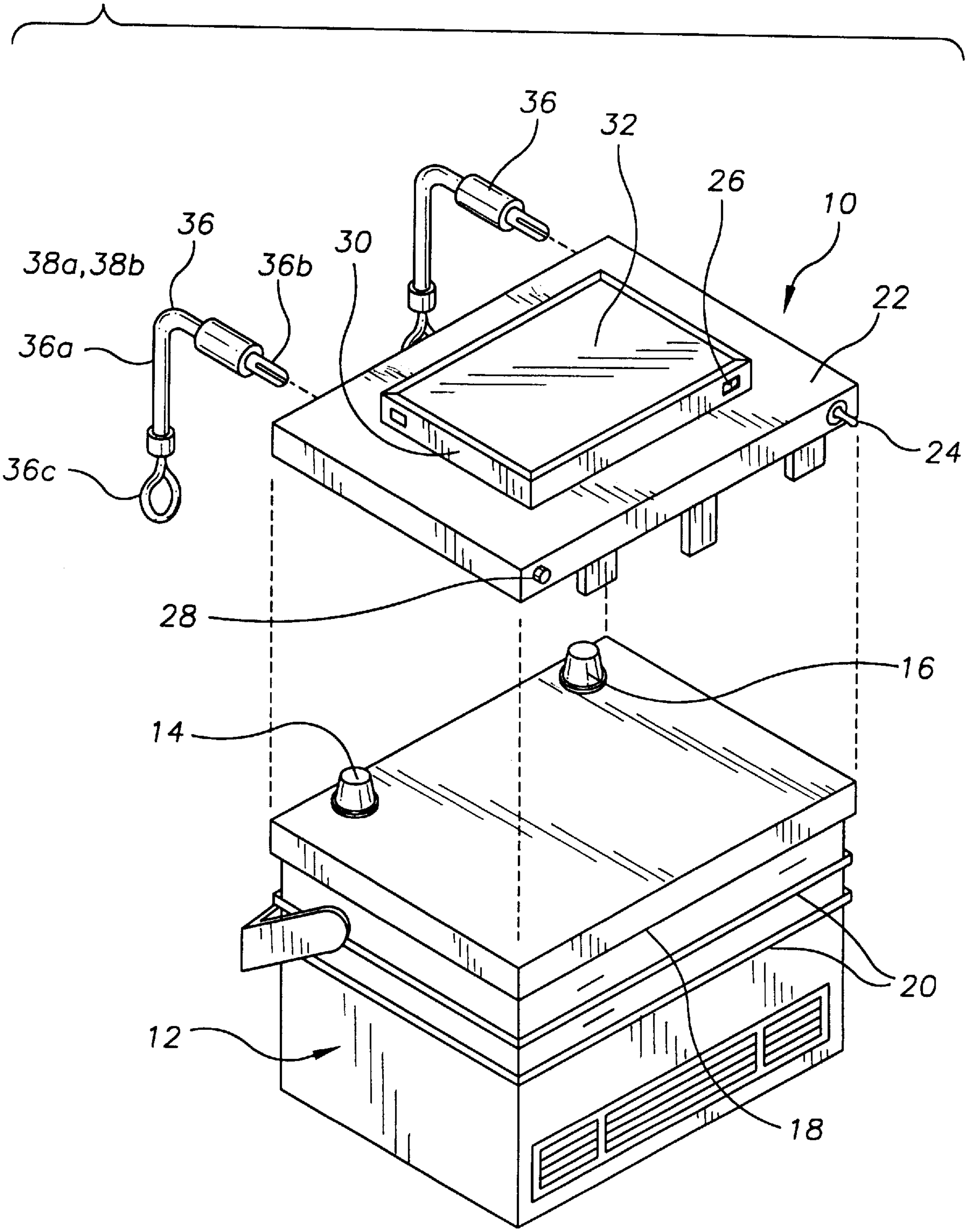
FIG. 1 is a perspective view of an exemplary embodiment of the emergency light system of the present invention positioned over a representative automobile battery and showing the rectangular shaped snap on system housing with one of the two main snap connectors and two of the four secondary snap connectors, the rectangular shaped bulb housing positioned on top of the system housing, the lamp diffuser lens covering the rectangular diffuser lens opening of the bulb housing, the air vent openings formed through the sidewall of the bulb housing, the main power switch, the on/off switch, the fuse compartment cover, and the two optional side terminal connecting cable assemblies provided for use on automobile batteries with side mounted terminals.

FIG. 1 shows an exemplary embodiment of the emergency light system of the present invention, generally designated 10, positioned above a representative wet cell vehicle battery, generally designated 12, having two top mounted terminals 14,16 a circumferential cap ridge 18 and two circumferential sealing ridges 20. In this embodiment, emergency light system 10 includes a snap on system housing 22, an illuminated main power switch 24; an on/off switch 26; a fuse compartment 28; a bulb housing 30, a light diffuser lens 32; a lamp socket 34 (FIG. 2); and identical first and second adapter cable assemblies 36. First and second adapter cable assemblies 36 each include a length of insulated copper conductor cable **36*a* connected between a conventional single prong plug 36*b* and a metal battery terminal mounting ring 36*c***.

Figure 2:
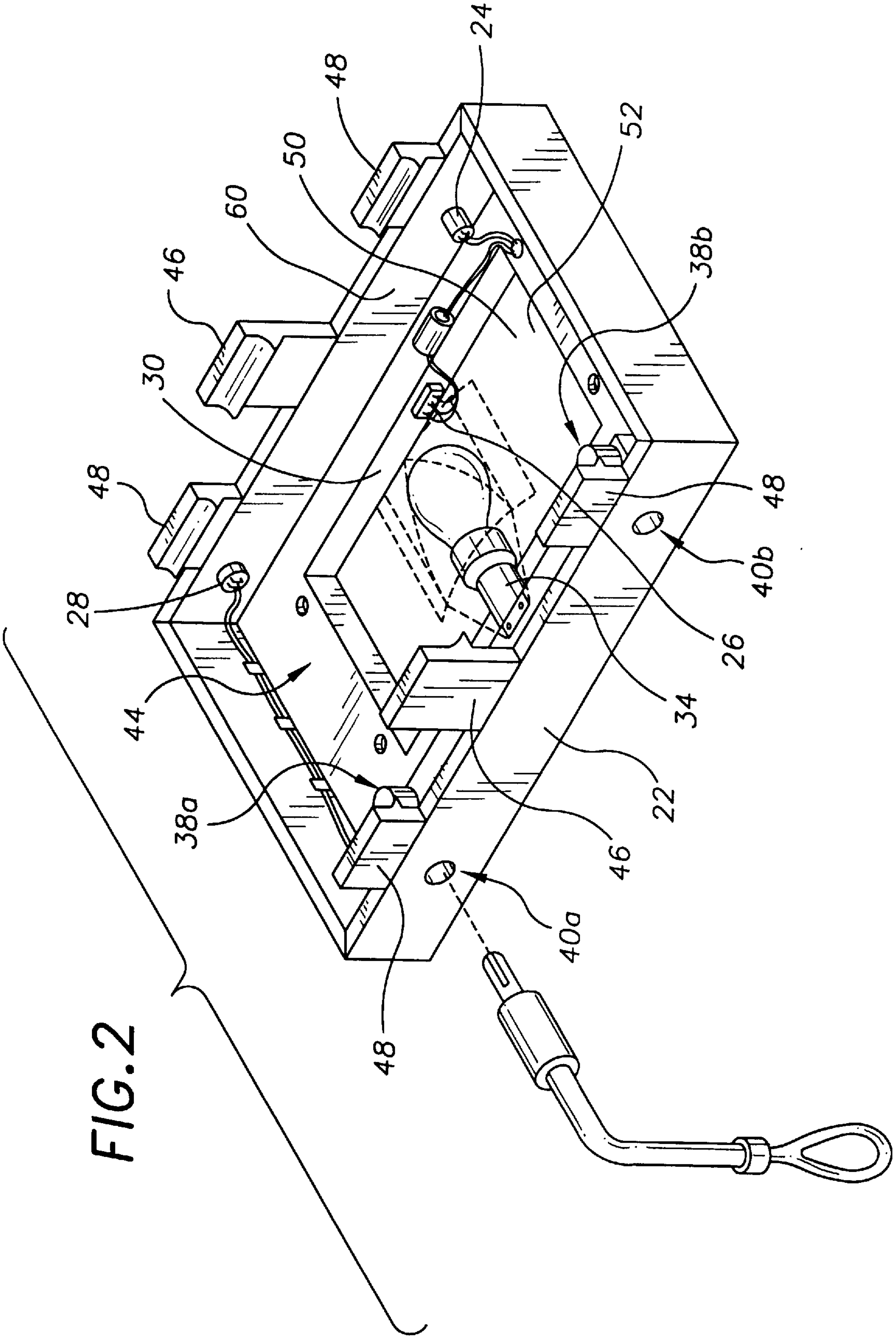
FIG. 2 is an underside perspective view of the emergency light system of the present invention showing the snap on system housing including the identical first and second terminal receiving members, the first and second adapter cable jacks, the battery top receiving compartment, the lamp compartment, the two main snap connectors and the four secondary snap connectors; the main power switch; the on/off switch; the fuse compartment; the light diffuser lens covering the opening of the rectangular lamp compartment; the lamp socket mounted within the rectangular lamp compartment; and one of the adapter cable assemblies including the plug, the cable, and the battery terminal mounting ring.

In this embodiment, snap on system housing 22 and bulb housing 30 are of molded plastic construction and are integrally formed. With reference to FIG. 2, snap on system housing 22 is rectangularly shaped and includes identical first and second terminal receiving members, generally designated **38*a*,38*b*; first and second adapter cable jacks, generally designated 40*a*,40*b*, a rectangular box shaped battery top receiving compartment 44, two main snap connectors 46 sized to snap connect to a circumferential sealing ridge 20 of battery 12; and four secondary snap connectors 48 sized to snap connect to circumferential cap ridge 18 of battery 12**.

Bulb housing 30 defines a rectangular shaped lamp compartment 50 having a rectangular diffuser lens opening 52 (FIG. 1) within which translucent white polycarbonate plastic diffuser lens 32 (FIG. 1) is installed. In this embodiment, bulb socket 34 is positioned into lamp compartment 50 and riveted into position.

Main power switch 24 and fuse compartment 28 are installed through mounting holes formed through a front sidewall 60 of snap on system housing 22. Fuse compartment 28 is a conventional in-line fuse holder. Main power switch 24 is an illuminated single contact single throw switch. On/off switch 26 is mounted through a mounting hole formed through a front sidewall of bulb housing 30.

Figure 3:
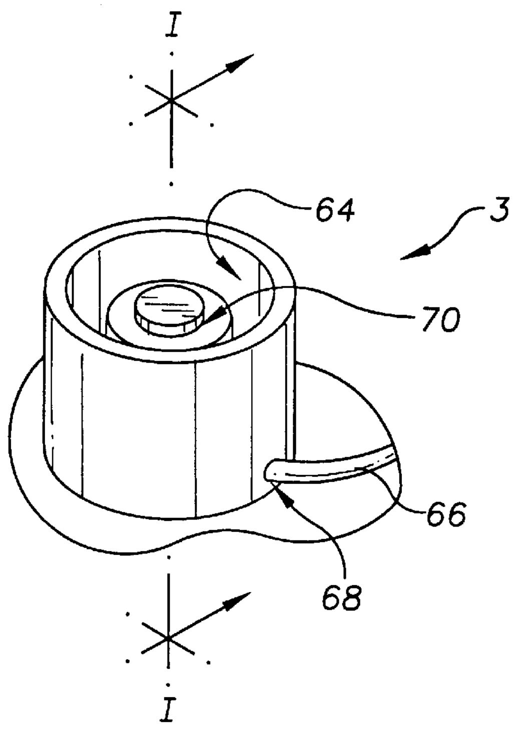
FIG. 3 is a perspective view of the first terminal receiving member showing the cylindrical shaped terminal receiving cavity formed therein, the circuit wire extending from the bottom of the terminal receiving member through a wire passageway, and the spring biased contact positioned within the terminal receiving cavity.
Figure 4:
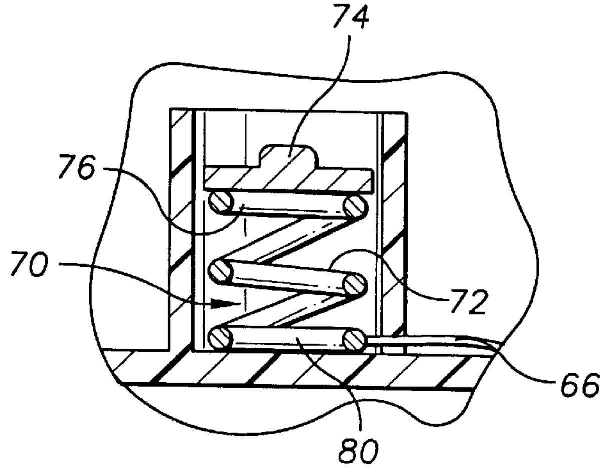
FIG. 4 is a cross sectional view of the first terminal receiving member through the line I—I of FIG. 3 showing the cylindrical shaped terminal receiving cavity formed into the terminal receiving member, the circuit wire extending from the bottom of the terminal receiving member through a wire passageway and connected with the biasing spring of the spring biased contact positioned within the terminal receiving cavity.

With reference to FIG. 3, each of the first and second terminal receiving members **38*a*,38*b* has a cylindrical shaped terminal receiving cavity 64 formed therein, a circuit wire 66 extending from the bottom thereof through a wire passageway 68, and a spring biased contact, generally designated 70, positioned within terminal receiving cavity 64. With reference to FIG. 4, spring biased contact 70 includes a steel biasing spring 72 and a lead contact member 74 that is soldered to a free moveable end 76 of biasing spring 72. A second end 80 of biasing spring 72 is soldered to circuit wire 66**.

Figure 5:
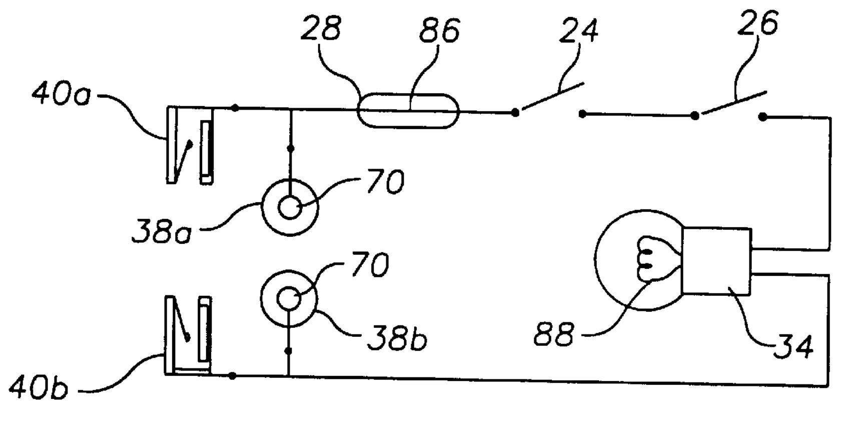
FIG. 5 is a schematic wiring diagram of the emergency light system of FIG. 1 showing the spring biased contact of the first terminal receiving member, the first adapter cable jack, the fuse, the main power switch, the on/off switch, the lamp socket, a representative lamp mounted within the lamp socket, the spring biased contact of the second terminal receiving member and the second adapter cable jack.

With reference to FIG. 5, during assembly of emergency light system 10, spring biased contact 70 of first terminal receiving member **38*a* and first adapter cable jack 40*a* are wired in parallel with each other and in series with a fuse 86 positioned within fuse holder 28, main power switch 24, on/off switch 26, a representative lamp 88 mounted within lamp socket 34, and spring biased contact 70 of second terminal receiving member 38*b* and second adapter cable jack 40*b*. Spring biased contact 70 of second terminal receiving member 38*b* and second adapter cable jack 40*b*** are wired in parallel with each other.

With general reference to FIGS. 1–5, in use, snap on system housing 22 is snapped onto battery 12 in a manner such that terminals 14,16 are each positioned into a terminal receiving cavity 64 of a terminal member **38*a*,38*b* and form an electrical connection with a contact member 74 of an electrical contact 70. Main power switch 24 is then used to disconnect power from system 10. On/off switch 26 is used to turn lamp 88 on and off when main power switch 24 is in the closed position. When battery 12** needs to be recharged, it can be installed into a vehicle and recharged by simply using the vehicle during the daylight hours.

It can be seen from the preceding description that an emergency light system has been provided that can be powered by a readily available and readily renewable power supply; that is adapted for use with automobile batteries; that includes adapters for connecting the emergency lighting system to side terminal type automobile batteries; and that includes a rectangular shaped snap on system housing member that has a battery top receiving compartment formed therein, first and second terminal receiving members extending into the battery top receiving compartment and two snap connectors for snap connecting the system housing member to a vehicle wet cell battery, the first and second terminal receiving members each having a cylindrical shaped terminal receiving cavity formed therein sized to receive a battery terminal of a vehicle wet cell battery and having a spring biased electrical contact positioned therein, each spring biased electrical contact including an electrically conducting biasing spring and a contact member attached to a moveable end of the biasing spring; a rectangular shaped bulb housing positioned on top of the system housing member and defining a lamp compartment in connection with a rectangular diffuser lens opening, the rectangular shaped bulb housing including air vent openings formed through a sidewall thereof and into airflow connection with the lamp compartment; a lamp diffuser lens covering the rectangular diffuser lens opening of the bulb housing member; an on/off switch; and a lamp socket mounted within the rectangular lamp compartment; the lamp socket being wired in series with the on/off switch and between the contact members of the spring biased electrical contacts positioned within the cylindrical shaped terminal receiving cavities of the first and second terminal receiving members.

It is noted that the embodiment of the emergency light system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An emergency light system comprising:

a rectangular shaped snap on system housing member that has a battery top receiving compartment formed therein, first and second terminal receiving members extending into said battery top receiving compartment and two snap connectors for snap connecting said system housing member to a vehicle wet cell battery, said first and second terminal receiving members each having a terminal receiving cavity formed therein sized to receive a battery terminal of a vehicle wet cell battery and further having a spring biased electrical contact positioned within each said terminal receiving cavity, each spring biased electrical contact including an electrically conducting biasing spring and a contact member attached to a moveable end of said biasing spring;

a bulb housing positioned on top of said system housing member and defining a lamp compartment in connection with a diffuser lens opening;

a lamp diffuser lens covering said diffuser lens opening of said bulb housing member;

an on/off switch; and a lamp socket mounted within said lamp compartment;

said lamp socket being wired in series with said on/off switch and between said contact members of said spring biased electrical contacts positioned within said cylindrical shaped terminal receiving cavities of said first and second terminal receiving members.

2. The emergency light system of claim 1, wherein:

said terminal receiving cavity of said first terminal receiving member is cylindrical shaped; and said terminal receiving cavity of said second terminal receiving member is cylindrical shaped.

3. The emergency light system of claim 1, wherein:

said diffuser lens opening is rectangular shaped; and said lamp diffuser lens is rectangular in shape.

4. The emergency light system of claim 1 wherein:

said bulb housing includes air vent openings formed through a sidewall thereof and into airflow connection with said lamp compartment.

5. The emergency light system of claim 1 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

6. The emergency light system of claim 2, wherein:

said diffuser lens opening is rectangular shaped; and said lamp diffuser lens is rectangular in shape.

7. The emergency light system of claim 2 wherein:

said bulb housing includes air vent openings formed through a sidewall thereof and into airflow connection with said lamp compartment.

8. The emergency light system of claim 2 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

9. The emergency light system of claim 6 wherein:

said bulb housing includes air vent openings formed through a sidewall thereof and into airflow connection with said lamp compartment.

10. The emergency light system of claim 6 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

11. The emergency light system of claim 9 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

12. The emergency light system of claim 7 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

13. The emergency light system of claim 3 wherein:

said bulb housing includes air vent openings formed through a sidewall thereof and into airflow connection with said lamp compartment.

14. The emergency light system of claim 3 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

15. The emergency light system of claim 13 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

16. The emergency light system of claim 4 further including:

first and second adapter cable assemblies, each said first and second adapter cable assembly including a length of insulated conducting cable connected between a connecting plug and a connecting mechanism for connectable to a side mounted terminal of an automobile battery, and wherein:

said system housing member further includes first and second adapter cable jacks, one said spring biased electrical contact being in electrical connection with said first adapter cable jack, another said spring biased electrical contact being in electrical connection with said first adapter cable jack;

said first cable adapter jack being sized to receive said connecting plug of said first adapter cable assembly;

said second cable adapter jack being sized to receive said connecting plug of said first adapter cable assembly.

* * * * *